(12) United States Patent
Barroso et al.

(10) Patent No.: US 6,668,308 B2
(45) Date of Patent: Dec. 23, 2003

(54) SCALABLE ARCHITECTURE BASED ON SINGLE-CHIP MULTIPROCESSING

(75) Inventors: Luiz Andre Barroso, Mountain View, CA (US); Kourosh Gharachorloo, Menlo Park, CA (US); Andreas Nowatzyk, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 09/877,793

(22) Filed: Jun. 8, 2001

(65) Prior Publication Data

US 2002/0046324 A1 Apr. 18, 2002

Related U.S. Application Data

(60) Provisional application No. 60/210,675, filed on Jun. 10, 2000.

(51) Int. Cl.$^7$ .............................................. G06F 12/00
(52) U.S. Cl. ..................... 711/141; 711/5; 711/122; 711/127; 711/118; 711/144; 365/230.03; 365/230.04; 709/213
(58) Field of Search .................... 711/118, 119, 711/141, 145, 127, 128, 147.5, 203.205, 5, 105, 149, 157, 209, 122; 370/295.31, 395.5, 351, 356; 709/213; 365/189.04, 220, 230.03, 230.04, 230.05

(56) References Cited

U.S. PATENT DOCUMENTS

| | | | |
|---|---|---|---|
| 5,386,547 A | | 1/1995 | Jouppi |
| 5,440,752 A | * | 8/1995 | Lentz et al. ................ 710/123 |
| 5,457,679 A | * | 10/1995 | Eng et al. ............... 370/395.31 |
| 5,634,110 A | * | 5/1997 | Laudon et al. .............. 711/145 |
| 5,778,437 A | * | 7/1998 | Baylor et al. ................ 711/141 |
| 6,202,127 B1 | * | 3/2001 | Dean et al. .................. 711/118 |
| 6,263,405 B1 | * | 7/2001 | Irie et al. ..................... 711/141 |
| 6,295,598 B1 | * | 9/2001 | Bertoni et al. ................ 712/28 |
| 6,457,100 B1 | * | 9/2002 | Ignatowski et al. ......... 711/119 |

OTHER PUBLICATIONS

Agarwal, Anant, et al., "An Evaluation of Directory Schemes for Cache Coherence", *Proceedings of 15$^{th}$ International Symposiumn on Computer Architecture("ISCA")* (May 1998) pp. 280–289.

Barroso, Luiz Andre, et al., "Impact of Chip–Level Integration on Performance of OLTP Workloads", *High–Performance Computer Architecture ("HPCA")* (Jan. 2000).

Barroso, Luiz Andre, et al., "Memory System Characterization of Commercial Workloads", *ICSA* (Jun. 1998).

Eggers, Susan J., et al., "Simultaneous Multithreading: A Platform for Next–generation Processors", *University of Washington, DEC Western Research Laboratory* ({eggers, levy,jlo}@cs.washington.edu) ({emer, stamm}@vssad.enet.dec.com) pp. 1–15.

(List continued on next page.)

*Primary Examiner*—Matthew Kim
*Assistant Examiner*—Zhou H. Li

(57) ABSTRACT

A chip-multiprocessing system with scalable architecture, including on a single chip: a plurality of processor cores; a two-level cache hierarchy; an intra-chip switch; one or more memory controllers; a cache coherence protocol; one or more coherence protocol engines; and an interconnect subsystem. The two-level cache hierarchy includes first level and second level caches. In particular, the first level caches include a pair of instruction and data caches for, and private to, each processor core. The second level cache has a relaxed inclusion property, the second-level cache being logically shared by the plurality of processor cores. Each of the plurality of processor cores is capable of executing an instruction set of the ALPHA™ processing core. The scalable architecture of the chip-multiprocessing system is targeted at parallel commercial workloads. A showcase example of the chip-multiprocessing system, called the PIRANHA™ system, is a highly integrated processing node with eight simpler ALPHA™ processor cores. A method for scalable chip-multiprocessing is also provided.

4 Claims, 8 Drawing Sheets

BLOCK DIAGRAM OF A SINGLE-CHIP PIRANHA PROCESSING NODE

OTHER PUBLICATIONS

Eickemeyer, Richard J., et al., "Evaluation of Multithreaded Uniprocessors for Commercial Application Environments", *ACM*(1996) (0–89791–786–3) pp. 203–212.

Gupta, Anoop, et al., "Reducing Memory and Traffic Requirements for Scalable Directory–Based Cache Coherence Schemes", *Stanford University Computer Systems Laboratory* pp. 1–10.

Hammond, Lance, et al., "A Single–Chip Multiprocessor", *IEEE* (Sep. 1997) (0018–9162).

Hammond, Lance, et al., "Data Speculation Support for a Chip Multiprocessor", *Stanford University, Computer Systems Laboratory* (http://www–hydra.stanford.edu/).

Jouppi, Norman P., et al., "Tradeoffs in Two–Level On–Chip Caching", *WRL Research Report 93/3, Western Research Laboratory* (WRL–Techreports@decwrl.dec.com) (Dec. 1993) pp. 1–31.

Krishnan, Venkata, et al., "Hardware and Software Support for Speculative Execution of Sequential Binaries on a Chip–Multiprocessor", *University of Illinois at Urbana–Champaign* (http://iacoma.cs.uiuc.edu.).

Kuskin, Jeffrey, et al., "The Stanford FLASH Multiprocessor", *Stanford University, Computer Systems Laboratory*.

Laudon, James, et al., "The SGI Origin: A ccNUMA Highly Scalable Server", *Silicon Graphics, Inc.* (laudon@sgi.com).

Lenoski, Daniel, et al. "The Directory–Based Cache Coherence Protocol for the DASH Multiprocessor", *IEEE* (1990) (CH2887–8) pp. 148–159.

Nayfeh, Basem A., et al., "Evaluation of Design Alternatives for a Multiprocessor Microprocessor", *ACM* (1996) (0–89791–786–3) pp. 67–77.

Nowatzyk, Andreas G., et al., "S–Connect: from Networks of Workstations to Supercomputer Performance", $22^{nd}$ *Annual International Symposium on Computer Architecture ("ISCA")* (Jun. 1995).

Nowatzyk, Andreas, et al., "Exploiting Parallelism in Cache Coherency Protocol Engines", *Sun Microsystems Computer Corporation*.

Olukotun, Kunle, et al., "The Case for a Single–Chip Multiprocessor", *Proceedings Seventh International Symposium Architectural Support for Programming Languages and Operating Systems ("ASPLOS VII")* (Oct. 1996).

Steffan, J. Gregory, et al., "The Potential for Using Thread–Level Data Speculation to Facilitate Automatic Parallelization", *HPCA–4* (Feb. 1998) pp. 1–12.

Tremblay, Marc, "MAJC™–5200 AVLIW Convergent MPSOC", *Sun Microsystems, Inc., Microprocessor Forum* (1999).

Kunkel, Steven, et al., "System Optimization for OLTP Workloads", *IEEE* (1999) (0272–1732) pp. 56–64.

Diefendorff, Keith, "Power4 Focuses on Memory Bandwidth", *Microdesign Resources, Microprocessor Report vol. 13 No. 13* (Oct. 1999).

Hammond, Lance, et al., "The Stanford Hydra CMP", *Stanford University, Computer Systems Laboratory* (http://www–hydra.stanford.edu).

\* cited by examiner

BLOCK DIAGRAM OF A SINGLE-CHIP PIRANHA PROCESSING NODE

BLOCK DIAGRAM OF A SINGLE-CHIP PIRANHA I/O NODE

EXAMPLE CONFIGURATION FOR A PIRANHA SYSTEM WITH SIX
PROCESSING (8 CPUs EACH) AND TWO I/O CHIPS.

PIRANHA'S (A) SPEEDUP AND (B) L1 MISS BREAKDOWN FOR OLTP

SPEEDUP OF OLTP IN MULTI-CHIP SYSTEMS WITH 500
Mhz 4-CPU PIRANHA CHIPS VERSUS 1 Ghz OUT-OF-ORDER CHIPS.
(A SINGLE-CHIP 4-CPU PIRANHA IS APPROXIMATELY 1.5x FASTER
THAN THE SINGLE-CHIP OOO)

PERFORMANCE POTENTIAL OF A FULL-CUSTOM
PIRANHA CHIP FOR OLTP AND DSS

FLOOR-PLAN OF THE PIRANHA
PROCESSING NODE WITH EIGHT CPU CORES

SCALABLE ARCHITECTURE BASED ON SINGLE-CHIP MULTIPROCESSING

REFERENCE TO PRIOR APPLICATION

This application claims the benefit of and incorporates by reference U.S. Provisional Application No. 60/210,675 filed Jun. 10, 2000.

CROSS REFERENCE TO RELATED APPLICATION

This application is related to and incorporates herein by reference U.S. patent application Ser. No. 10/210,655, filed Jun. 9, 2002, by L. A. Barroso et al. entitled "Method and System for Exclusive Two-Level Caching in a Chip-Multiprocessor."

BACKGROUND OF THE INVENTION

1. Field of the Invention

This application relates to complex microprocessor design and, specifically, to chip-multiprocessor design with two-level caching.

2. Background Art

High-end microprocessor designs are becoming increasingly complex, with designs continuously pushing the limits of instruction-level parallelism and speculative out-of-order execution. Associated with such complexity are higher development costs and longer design times. Meanwhile, such designs are not suited for important commercial applications, such as on-line transaction processing (OLTP) because they suffer from large memory stall times and exhibit little instruction-level parallelism. Given that commercial applications constitute by far the most important market for high-performance servers, the above trends emphasize the need to consider alternative processor designs that specifically target such workloads. The abundance of explicit thread-level parallelism in commercial workloads, along with advances in semiconductor integration density, identify chip multiprocessing (CMP) as potentially the most promising approach for designing processors targeted at commercial servers.

Commercial workloads such as databases and world-wide web (Web) applications have surpassed technical workloads to become the largest and fastest-growing market segment for high-performance servers. A number of recent studies have underscored the radically different behavior of commercial workloads such as OLTP relative to technical workloads. First, commercial workloads often lead to inefficient executions dominated by a large memory stall component. This behavior arises from large instruction and data footprints and high communication miss rates which are characteristic for such workloads. Second, multiple instruction issue and out-of-order execution provide only small gains for workloads such as OLTP due to the data-dependent nature of the computation and the lack of instruction-level parallelism. Third, commercial workloads do not have any use for the high-performance floating-point and multimedia functionality that is implemented in current microprocessors. Therefore, it is not uncommon for a high-end microprocessor to be stalling most of the time while executing commercial workloads, leading to a severe under-utilization of its parallel functional units and high-bandwidth memory system. Overall, the above trends further question the wisdom of pushing for more complex processor designs with wider issue and more speculative execution, especially if the server market is the target.

However, increasing chip densities and transistor counts provide architects with several alternatives for better tackling design complexities in general, and the needs of commercial workloads in particular. Higher transistor counts can also be used to exploit the inherent and explicit thread-level (or process-level) parallelism that is abundantly available in commercial workloads to better utilize on-chip resources. Such parallelism typically arises from relatively independent transactions or queries initiated by different clients, and has traditionally been used to hide I/O latency in such workloads. Previous studies have shown that techniques such as simultaneous multithreading (SMT) can provide a substantial performance boost for database workloads. While the SMT approach is superior in single-thread performance (important for workloads without explicit thread-level parallelism), it is best suited for very wide-issue processors which are more complex to design. In comparison, CMP advocates using simpler processor cores at a potential loss in single-thread performance, but compensates in overall throughput by integrating multiple such cores. Furthermore, CMP naturally lends itself to a hierarchically partitioned design with replicated modules, allowing chip designers to use short wires as opposed to costly and slow long wires that can adversely affect cycle time.

Accordingly there is a need for to build a system that achieves superior performance on commercial workloads (especially OLTP) with a smaller design team, more modest investment, and shorter design time. The present invention addresses these and related issues.

SUMMARY OF THE INVENTION

In accordance with the purpose of the invention, as embodied and broadly described herein, the invention relates to a method for scalable chip-multiprocessing and a chip-multiprocessor (CMP) system an example of which is referred to as the PIRANHA™ system (PIRANHA™ is a trademark of Compaq Computer Corporation, Houston Tex.). The design of this CMP system employs chip multiprocessing architectures targeted preferably at parallel commercial workloads. Then, as a functional and architectural strategy, the present invention exploits chip-multiprocessing (CMP) in integrating a plurality of simpler processor cores, such as ALPHA™ processor cores, along with a two-level cache hierarchy on a single chip (ALPHA™ is a trademark of Compaq Computer Corporation, Houston Tex.). The use of simpler processor cores combined with an industry-standard ASIC design methodology allow completion of a CMP prototype such as the PIRANHA™ system within a shorter time and with a smaller team and investment than that of current commercial microprocessor.

Preferably, the PIRANHA™ architecture includes a highly-integrated processing node with eight simpler ALPHA™ processor cores, separate instruction and data caches for each core, a shared second-level cache, eight memory controllers, two coherence protocol engines, and a network router all on a single chip die. Multiple such processing nodes can be used to build a glueless multiprocessor in a modular and scalable fashion. Hence, the PIRANHA™ architecture includes also functionality for allowing the scalable multiprocessor configurations to be built in the glueless and modular fashion.

As a further design strategy, the shared second-level cache has a relaxed or non-inclusion property. Moreover, the PIRANHA™ system incorporates a highly-optimized cache coherence protocol and a novel input/output (I/O) architecture. The design of the shared second-level cache uses a sophisticated protocol that does not enforce inclusion in first-level instruction and data caches in order to maximize the utilization of on-chip caches. Additionally, the CMP system includes an I/O node, a unique I/O architecture, that is a full-fledged member of the interconnect and global shared-memory coherence protocol.

Advantages of the invention will be understood by those skilled in the art, in part, from the description that follows. Advantages of the invention will be realized and attained from practice of the invention disclosed herein.

BRIEF DESCRIPTION OF THE DRAWINGS

The accompanying drawings, which are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

Figure 1:
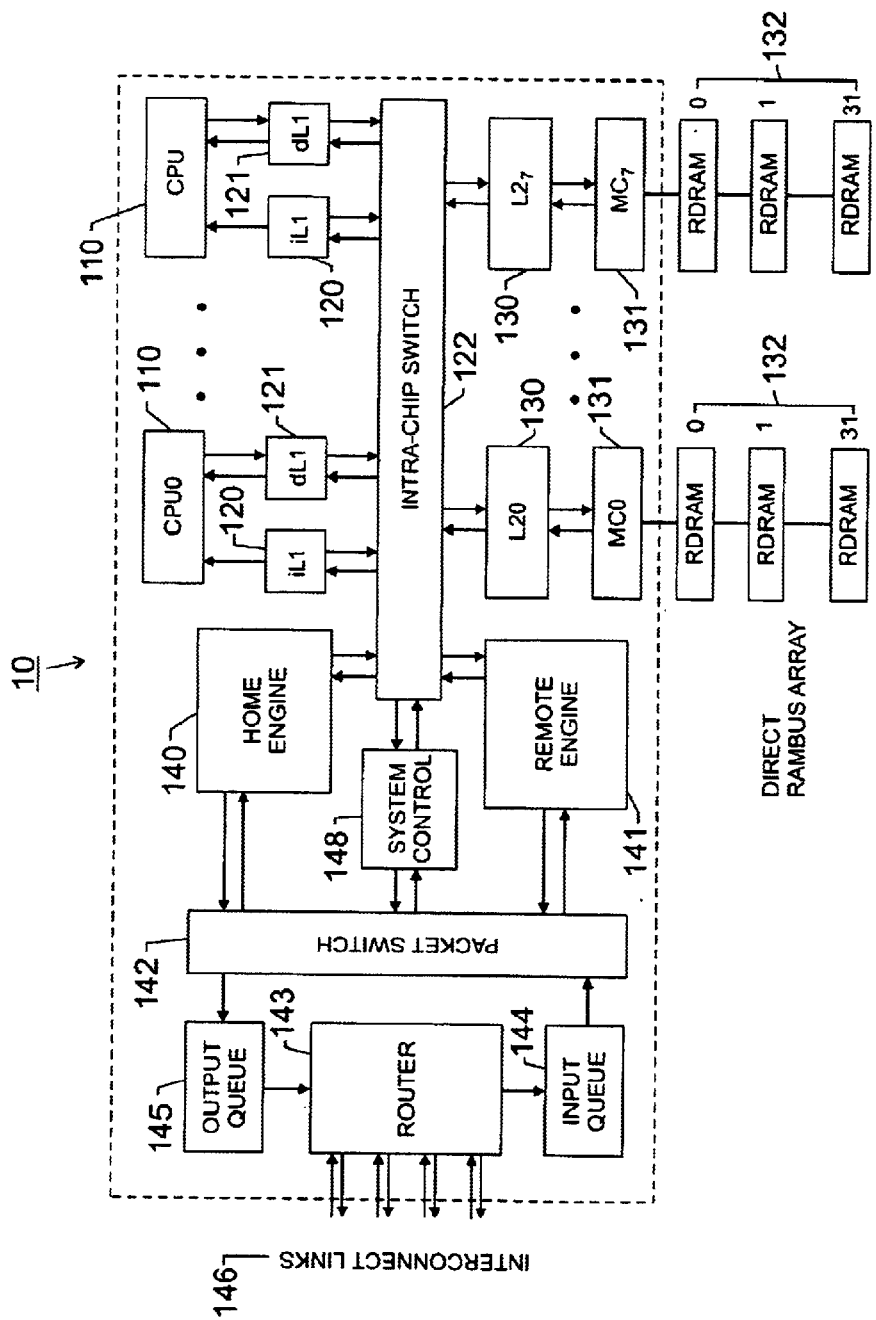
FIG. 1 shows the block diagram of a single PIRANHA™ processing chip.

The present invention is related to multiprocessing design, and its main purpose is to achieve a system with superior performance on commercial workloads that requires a smaller design team, more modest investment and shorter design time. The design of a system with superior performance is especially targeted for commercial workloads such as on-line transaction processing (OLTP). To enable one of ordinary skill in the art to make and use the invention, the description of the invention is presented herein in the context of a patent application and its requirements. Although the invention will be described in accordance with the shown embodiments, one of ordinary skill in the art will readily recognize that there could be variations to the embodiments and those variations would be within the scope and spirit of the invention.

To achieve the foregoing and related objectives, the present invention is directed to a method for scalable chip-multiprocessing and a chip-multiprocessor (CMP) system an example of which is referred to as the PIRANHA™ system (PIRANHA™ is a trademark of Compaq Computer Corporation, Houston Tex.). The design of this CMP system employs chip multiprocessing architectures targeted preferably at parallel commercial workloads. Then, as a functional and architectural strategy, the present invention exploits chip-multiprocessing (CMP) in integrating a plurality of simpler processor cores, such as ALPHA™ processor cores, along with a two-level cache hierarchy on a single chip (ALPHA™ is a trademark of Compaq Computer Corporation, Houston Tex.). The use of simpler processor cores combined with an industry-standard ASIC design methodology allow completion of a CMP prototype such as the PIRANHA™ system within a shorter time and with a smaller team and investment than that of current commercial microprocessor. A "CMP system" as described herein above and below is interchangeably referred to herein as the "PIRANHA™ system" or simply "PIRANHA™".

Preferably, the centerpiece of the PIRANHA™ architecture is a highly-integrated processing node with eight simpler ALPHA™ processor cores, separate instruction and data caches for each core, a shared second-level cache, eight memory controllers, two coherence protocol engines, and a network router all on a single chip die. Multiple such processing nodes can be used to build a glueless multiprocessor in a modular and scalable fashion. The PIRANHA™ architecture includes also functionality for allowing the scalable multiprocessor configurations to be built in the glueless and modular fashion.

In addition to making use of chip-multiprocessing, the PIRANHA™ system implementation incorporates several other unique design choices. These design choices include a shared second-level cache with a relaxed or no inclusion property, a highly optimized cache coherence protocol, and novel input/output (I/O) architecture. The design of the shared second-level cache uses a sophisticated protocol that does not enforce inclusion in first-level instruction and data caches in order to maximize the utilization of on-chip caches. The cache coherence protocol for communications among nodes incorporates a number of unique features that result in fewer protocol messages and lower protocol engine occupancies compared to previous protocol designs. Additionally, the PIRANHA™ has a unique I/O architecture, with an I/O node that is a fill-fledged member of the interconnect and global shared-memory coherence protocol.

The preferred CMP system implementation uses simpler processor cores having a single-issue in-order eight-stage pipelined design. Also used are a semi-custom design based on industry-standard ASIC methodologies and tools, making heavy use of synthesis with standard cells. To achieve acceptable performance, the design relies on a state-of-the-art 0.18 um ASIC process and makes limited use of custom-designed memory cells for a few time- or area-critical memory structures. Nonetheless, some of the modules are larger in area and the target clock speed is about half of what could be achieved with custom logic in the same process technology.

Advantages of a CMP system and method in accordance with the present invention can be measured, e.g., by a detailed performance evaluation of the PIRANHA™ system, based on full system simulations, including operating system activity, with the Oracle commercial database engine running under Compaq Tru64 Unix. Simulation results based on the foregoing show that each PIRANHA™ processor core may be substantially slower than an aggressive next-generation processor. However, these results also show that the integration on a single-chip of a plurality of processor cores, e.g., eight ALPHA™ cores, allows the PIRANHA™ system to outperform next-generation processors by about 2.3 to 2.9 times (on a per chip basis) on important workloads such as OLTP. The true potential of the PIRANHA™ architecture is more fairly judged by considering a full-custom design. By using full-custom design instead of ASIC logic design, this performance advantage can approach a factor of five (5). This approach clearly requires a larger design team and investment, but still maintains the relatively low complexity and short design time characteristics. These results clearly indicate that a focused design such as the PIRANHA™ system design that directly targets commercial server applications can substantially outperform any general-purpose microprocessor design with much higher complexity.

For example, the next-generation ALPHA™ 21364 aggressively exploits semiconductor technology trends by including a scaled 1 GHz 21264 core (i.e., shrink of the current ALPHA™ processor core to 0.18 um technology), two levels of caches, memory controller, coherence hardware, and network router all on a single die. The tight coupling of these modules enables a more efficient and lower latency memory hierarchy which can substantially improve the performance of commercial workloads. Furthermore, the reuse of an existing high-performance processor core in designs such as the ALPHA™ 21364 effectively addresses the design complexity issues and provides better time-to-market without sacrificing server performance.

In fact, the ALPHA™ 21464 (successor to ALPHA™ 21364) is planning to combine aggressive chip-level integration (see previous paragraph) along with an eight-instruction-wide out-of-order processor with SMT support for four simultaneous threads. As explained herein, the alternative approach, referred to as chip multiprocessing (CMP), advantageously involves integrating multiple (preferably simpler) processor cores onto a single chip (including a single PIRANHA™ processing chip as will further explained below).

In essence, a CMP design such as the PIRANHA™-based approach targets commercial applications (which currently constitute the largest segment for high-performance servers) at the possible expense of other types of workloads. Although there are other processor designs in progress that are specifically focused on commercial markets, a CMP design using the PIRANHA™-based approach is distinguishable from them in numerous important ways, as explained herein.

Some studies (at Stanford University) evaluated and have been supporting the use of chip multiprocessing (CMP) in the context of workloads such as SPEC; and the Hydra project is exploring CMP with a focus on thread-level speculation. Current implementations integrate four 250 MHz processors each with 8 KB instruction and data caches and a shared 128 KB second-level cache onto a small chip. However, there are a number of differences between Hydra and PIRANHA™-based approach. For example, a PIRANHA™ system has eight cores, a second-level cache that does not maintain inclusion, a high-speed switch instead of a bus to connect the on-chip cores. Additionally, the PIRANHA™ design provides scalability past a single chip by integrating the required on-chip functionality to support glueless multiprocessing. Furthermore, PIRANHA™ focuses on commercial workloads, which have an abundance of explicit thread-level parallelism. Therefore, support for thread-level speculation as proposed by Hydra and others is not necessary for achieving high performance on such workloads.

There are a number of CMP designs being studied but these design are surpassed by the PIRANHA™-based design in architecture and functionality. As an example, the Power4 chip is a CMP design that has two 1-GHz, five-issue, out-of-order superscalar processor cores, along with an on-chip shared L2 cache. Four such chips can be connected on a multi-chip module to form an eight-processor system with a logically shared L2 cache. By contrast, the PIRANHA™-based design takes a more extreme approach by incorporating eight much simpler processor cores on a single chip, and providing on-chip functionality for a scalable design. As a further example, a CMP design called the MAJC-5200 is an implementation of the MAJC architecture targeted at multimedia and Java applications. The MAJC-5200 contains two 500 MHz VLIW processors, each capable of issuing four instructions per cycle. The cores have each their own 16 KB instruction cache, but share a 16 KB, 4-way L1 data cache. Unlike the PIRANHA™-based design, the choice of sharing the L1 cache clearly does not scale well to more cores. Furthermore, the small size of the L1 along with the lack of an on-chip L2 cache makes MAJC-5200 design non-optimal for commercial workloads such as OLTP.

Simultaneous multithreading (SMT) (and other forms of multithreading) is an alternative to CMP for exploiting the thread-level parallelism in commercial workloads. In fact, SMT can provide a substantial gain for OLTP workloads and a reasonably large gain for DSS workloads when it is coupled with very wide-issue out-of-order processors. An SMT processor adds extra functionality and resources (e.g., larger register file) to an out-of-order core to support multiple simultaneous threads. As such, SMT increases the implementation and verification complexity that comes with such designs. Furthermore, intelligent software resource management is sometimes necessary in SMT to avoid negative performance effects due to the simultaneous sharing of critical resources such as the physical register file, L1 caches, and TLBs [27]. The advantage of SMT over CMP is that it provides superior performance on workloads that do not exhibit thread-level parallelism. As will be clear from the description herein, because the PIRANHA™ design targets workloads with an abundance of parallelism, the PIRANHA™-based design approach favors design simplicity over single-thread performance.

I. Architecture Overview

FIG. 1 shows the block diagram of a single PIRANHA™ processing chip 10. Each ALPHA™ CPU core (central processing unit or CPU) 110 is directly connected to dedicated instruction (iL1) and data cache (dLI) modules 120 and 121. These first-level caches interface to other modules through the IntraChip Switch (ICS) 122. On the other side of the ICS 122 is a logically shared second level cache (L2) 130 that is interleaved into eight separate modules, each with its own controller, on-chip tag, and data storage. Attached to each L2 module 130 is a memory controller (MC) 131 which directly interfaces to one bank of up to 32 direct Rambus™ DRAM chips 132. Each memory bank 132 provides a bandwidth of 1.6 GB/sec, leading to an aggregate bandwidth of 12.8 GB/sec. Also connected to the ICS 122 are two protocol engines, the Home Engine (HE) 140 and the Remote Engine (RE) 141, which support shared memory across multiple PIRANHA™ chips. The interconnect subsystem that links multiple PIRANHA™ chips consists of a Router (RT) 143, an Input Queue (IQ) 144, an Output Queue (OQ) 145 and a Packet Switch (PS) 142. The total interconnect bandwidth (in/out) for each PIRANHA™ processing chip is 32 GB/sec. Finally, the System Control (SC) module 148 takes care of miscellaneous maintenance-related functions (e.g., system configuration, initialization, interrupt distribution, exception handling, performance monitoring).

It should be noted that the various modules communicate exclusively through the connections shown in FIG. 1 which also represent the actual signal connections 146. This modular approach leads to a strict hierarchical decomposition of the PIRANHA™ chip which allows for the development of each module in relative isolation along with well defined transactional interfaces and clock domains.

Figure 2:
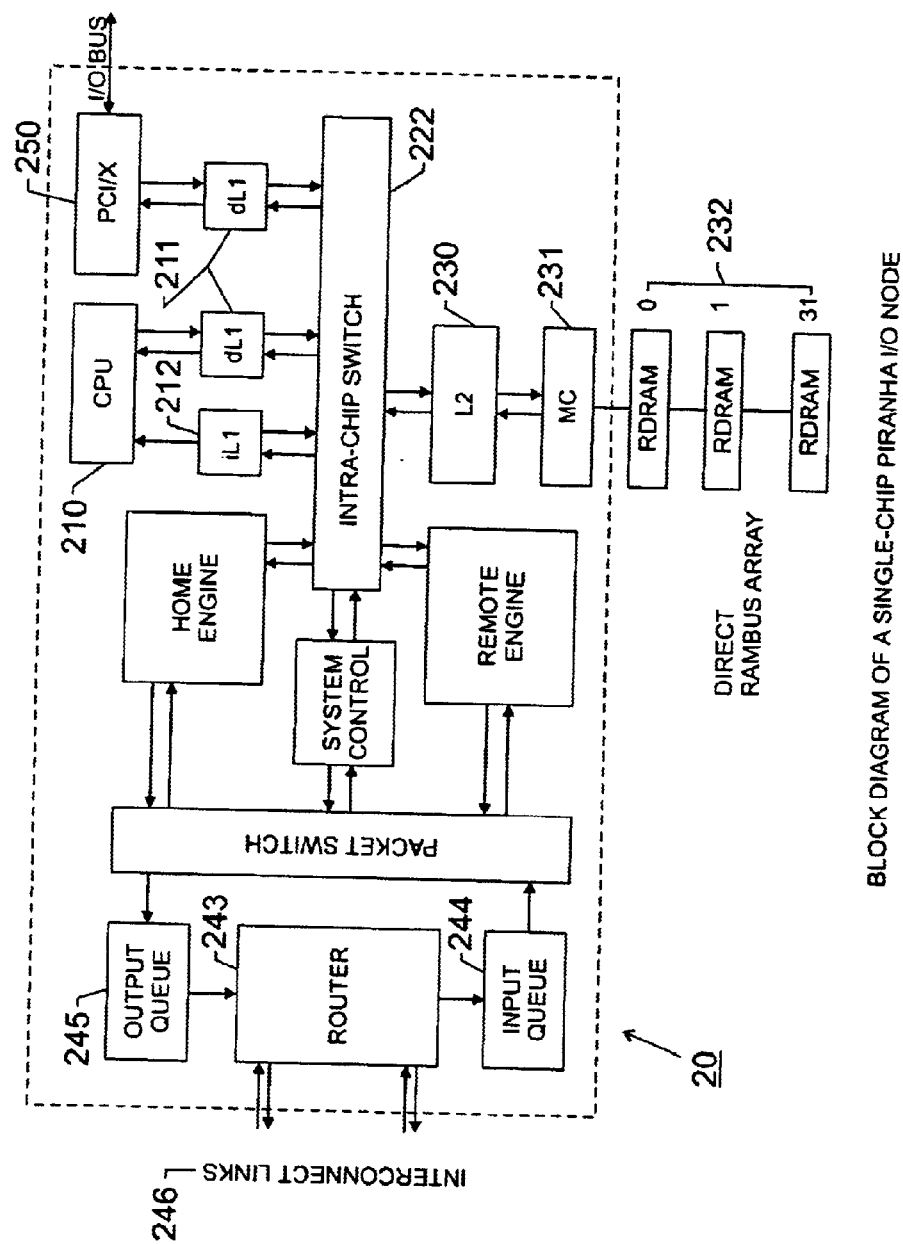
FIG. 2 illustrates block diagram of a single-chip PIRANHA™ node.

While the PIRANHA™ processing chip 10 is a complete multiprocessor system on a chip, it does not have any I/O capability. The actual I/O is performed by an I/O chip such as the PIRANHA™ I/O chip 20, shown in FIG. 2, which is relatively small in area compared to the processing chip 10 (FIG. 1). Each I/O chip 20 is a stripped-down version of the PIRANHA™ processing chip with only one CPU 210 and one L2/MC module 230–232. The router 243 on the I/O chip 20 is also simplified to support only two instead of four links 246, thus alleviating the need for a routing table. From the programmer's point of view, the CPU 210 on the I/O chip 20 is indistinguishable from one on the processing chip 10. Similarly, the memory on the I/O chip fully participates in the global cache coherence scheme. The presence of a processor core 210 on the I/O chip provides several benefits. One benefit is enabling optimizations such as scheduling device drivers on the processor core 210 for lower latency access to I/O. Another benefit is that it can be used to virtualize the interface to various I/O devices (e.g., by having the ALPHA™ core interpret accesses to virtual control registers).

Except for the PCI/X interface 250, which is available in an ASIC library, most of the modules on the I/O chip are identical in design to those on the processing chip 10. To simplify the design, the first-level data cache module (dL1) is reused to interface to the PCI/X module 250. The dL1 module 211 also provides the PCI/X 250 with address translation, access to I/O space registers, and interrupt generation. The PIRANHA™ I/O chip 20 may also be customized to support other I/O standards such as Fiber Channel and System I/O.

Figure 3:
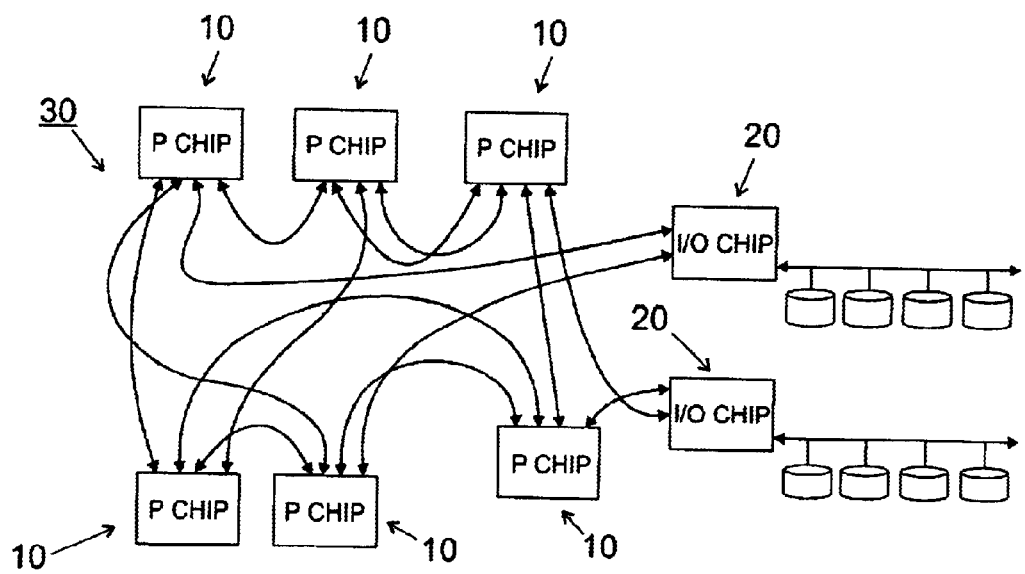
FIG. 3 illustrates a system with six processing (8 CPUs each) and two I/O chips.

FIG. 3 shows an example configuration of a PIRANHA™ system 30 with both processing and I/O chips 10 and 20. The PIRANHA™ design allows for glueless scaling up to 1024 nodes, with an arbitrary ratio of I/O to processing nodes (which can be adjusted for a particular workload). Furthermore, the PIRANHA™ router supports arbitrary network topologies and allows for dynamic reconfigurability. In the preferred PIRANHA™ architecture, I/O is treated in a uniform manner as a full-fledged member of the interconnect. In part, this decision is based on the observation that available inter-chip bandwidth is best invested in a single switching fabric that forms a global resource which can be dynamically utilized for both memory and I/O traffic.

Preferably also, an upgrade to a PIRANHA™-based processing system remains binary compatible with the ALPHA™ software base, including both applications and system software (e.g., compilers, operating system, etc.). Therefore, user applications will run without any modification, and with a minimal porting effort for the operating system (OS—Tru64 Unix).

The sections below provide more detail about the various modules in the PIRANHA™ system architecture.

A. ALPHA™ CPU Core and First-Level Caches

As mentioned, the processor core uses a single-issue, in-order CPU design and it is preferably capable of executing the ALPHA™ instruction set. It consists of a 500 MHz pipelined datapath with hardware support for floating-point operations (not shown). The pipeline has 8 stages: instruction, fetch, register-read, a 5-stage arithmetic logic unit (ALU 1 through 5), and write-back. The 5-stage ALU supports pipelined floating-point and multiply instructions. However, most instructions execute in a single cycle. The processor core includes several performance-enhancing features including a branch target buffer, pre-compute logic for branch conditions, and a fully bypassed datapath. The processor core interfaces to separate first-level instruction and data caches designed for single-cycle latency. The first-level instruction and data caches are generically referred to as "L1". The first-level caches are 64 KB two-way set-associative, blocking caches with virtual indices and physical tags. The LI cache modules include tag compare logic, instruction and data translation look-aside buffers (TLBs; 256 entries, 4-way associative), and a store buffer (data cache only). A 2-bit state field is maintained per cache line, corresponding to the four states in a typical MESI (modified, exclusive, shared, invalid) protocol. The MESI protocol is a cache coherency protocol where each cache line is marked with one of the four states. For simplicity, the instruction and data caches use virtually the same design. Therefore, unlike other ALPHA™ implementations, the instruction cache is kept coherent by hardware. Treating the instruction and data caches in the same way also simplifies the no-inclusion policy at the second-level cache (L2) level.

B. Intra-Chip Switch

Conceptually, the intra-chip switch (ICS), e.g., 122 (FIG. 1), is a crossbar that interconnects most of the modules on a PIRANHA™ chip. However, managing the data transfers from its multiple (e.g. 27) clients efficiently poses a number of implementation challenges, such as arbitration, flow control, and layout. The ICS is also the primary facility for decomposing the PIRANHA™ design into relatively independent, isolated modules. In particular, the transactional nature of the ICS allows the addition or removal of pipeline stages during the design of various modules without compromising the overall PIRANHA™ timing.

The ICS uses a unidirectional, push-only interface. The initiator of a transaction always sources data. If the destination of a transaction is ready, the ICS schedules the data transfer according to datapath availability. A grant is issued to the initiator to commence the data transfer at a rate of one 64-bit word per cycle without any further flow control. Concurrently, the destination receives a request signal that identifies the initiator and the type of transfer. Transfers are atomic, and the implied ordering properties are exploited in supporting intra-chip coherence.

Each port to the ICS consists of two independent 64-bit datapaths (plus 8-bit parity/ECC bits, i.e., error detection and correction bits) for sending and receiving data. The ICS supports back-to-back transfers, without dead-cycles between transfers. In order to reduce latency, modules are allowed to issue the target destination of a future request ahead of the actual transfer request. This hint is used by the ICS to pre-allocate datapaths and to speculatively assert the requester's grant signal.

The ICS is implemented by using a set of internal datapaths, preferably a set of eight internal datapaths, that run along the center of the PIRANHA™ processing chip. Given that the internal ICS capacity is 32 GB/sec or about 3 times the available memory bandwidth, achieving an optimal schedule is not critical to achieving good performance.

The ICS supports two logical lanes (low-priority and high-priority) that are used to avoid intra-chip cache coherence protocol deadlocks. Instead of adding extra datapaths, multiple lanes are supported by two ready lines with distinct a ID (identifications) for each module. An initiator can specify the appropriate lane for a transaction by using the corresponding ID for the destination.

C. Second-Level Cache

The second-level cache (L2) in the PIRANHA™ processing chip (FIG. 1) is a 1 MB unified instruction/data cache which is physically partitioned into eight banks and is logically shared among all CPUs. The L2 banks are interleaved using the lower address bits of a cache line's physical address (64-byte line). Each bank is 8-way set-associative and uses a round-robin (or least-recently-loaded) replacement policy if an invalid block (cache line) is not available. Each bank has its own control logic, an interface to its private memory controller, and an ICS interface used to communicate with other chip modules. The L2 controllers are responsible for maintaining intra-chip coherence, and cooperate with the protocol engines to enforce intra-chip coherence.

Since the aggregate capacity of the first-level caches (L1) in the PIRANHA™ system is 1 MB, maintaining data inclusion in the 1 MB second-level cache (L2) can take over and potentially waste the entire L2 capacity with duplicate data. Therefore, the PIRANHA™ system is preferably configures with a relaxed inclusion property or an exclusive cache hierarchy, i.e., non-inclusive cache hierarchy. Although exclusive on-chip cache hierarchies have been previously studied in the context of a single-CPU chip, the use of this technique in the context of a CMP system is yet unexplored. Exclusive on-cache hierarchy in a CMP system leads to interesting issues related to coherence and allocation/replacement policies. To simplify intra-chip coherence and avoid the need for L1 caches lookup, a CMP system such as the PIRANHA™ system keeps a duplicate copy of the L1 tags and state at the L2 controllers. Each controller maintains tag-state information for L1 cache lines that map to it given the address interleaving. The total overhead for the duplicate L1 tag-state across all controllers is less than $\frac{1}{32}$ of the total on-chip memory.

In order to lower miss latency and best utilize the L2 capacity, L1 misses that also miss in the L2 are filled directly from memory without allocating a cache line in the L2 cache. The L2 cache effectively behaves as a very large victim cache that is filled only when data is evicted from the L1 caches. Hence, even clean cache lines that are evicted from an L1 cache may cause a write-back to the L2 cache. To avoid unnecessary write-backs when multiple L1 caches have copies of the same cache line, the concept of ownership is introduced. Namely, the duplicate L1 state (which L2 maintains) is extended to include the indication of ownership. The owner of a line is either the L2 (when it has a valid copy), an L1 in the exclusive state, or one of the L1 caches (typically the last requester) when the cache line is shared by multiple L1 caches. Based on this information, upon an L1 conflict miss indication and need to evict a cache line from an L1 cache and replace it with the requested cache line, the L2 (controller) decides whether and which L1 cache should write back its cache line (one of the evicted line copies). The decision on the write-back is appended to the reply from L2 to the request (that caused the eviction). In the case of a cache line shared by multiple caches, a write-back happens only when an owner L1 replaces the cache line. The above approach provides a near-optimal replacement policy without affecting the L2 cache hit time. Alternative solutions that require checking all L1 states or the state of the victim in the L2 cache is ruled out since they would require multiple tag lookup cycles in the critical path of an L2 hit.

1. Intra-chip Coherence Protocol.

The L2 controllers are responsible for enforcing coherence within a chip. Each controller has complete and exact information about the on-chip cached copies for each subset of lines that map to it. On every L2 cache access, the duplicate L1 tag-state and the tag-state of the L2 itself are checked in parallel. Therefore, the intra-chip coherence in the CMP system has similarities to a full-map centralized directory-based protocol. Information about sharing of data across chips is kept in the directory, which is stored in DRAM and accessed through the memory controller (as will be later explained). Full interpretation and manipulation of the directory bits, is done only by the protocol engines. However, the L2 controllers can partially interpret the directory information to determine whether a line is cached by a remote node(s) and, if so, whether it is cached exclusively. This partial information, which is kept in the L2 and duplicate L1 states, allows the L2 controller at home to avoid communicating with the protocol engines for the majority of local L1 requests. In many cases this partial information also avoids having to fetch the directory from memory when a copy of the line is already cached in the chip.

A memory request from an L1 cache is sent to the appropriate L2 bank based on the address interleaving. Depending on the state at the L2, the L2 can possibly: (a) service the request directly, (b) forward the request to a local (owner) L1, (c) forward the request to one of the protocol engines, or (d) obtain the data from memory through the memory controller (only if the home is local). The L2 is also responsible for all instances of on-chip invalidation, whether triggered by local or remote requests. The ordering characteristics of the intra-chip switch avoid the need for acknowledgments for on-chip invalidations. Invalidating and forwarding requests to remote nodes are handled through the protocol engines. Requests forwarded to the home engine carry a copy of the directory, which is updated by the home engine and later written back to memory. In all forwarding cases, the L2 keeps a request-pending entry which is used to block conflicting requests for the duration of the original transaction. A small number of such entries are supported at each L2 controller in order to allow concurrent outstanding transactions.

D. Memory Controller

The CMP system such as the PIRANHA™ system has a high bandwidth, low latency memory system based on a preferred direct Rambus™ RDRAM. In keeping with a modular design philosophy, there is one memory controller and associated RDRAM channel for each L2 bank, for a total of, say, eight memory controllers. When using the preferred Rambus™ RDRAM, each Rambus™ channel can support up to 32 RDRAM chips. In the 64 Mbit memory chip generation, each PIRANHA™ processing chip can support a total of 2 GB of physical memory (8 GB/32 GB with 256 Mb/1 Gb chips). Each RDRAM channel has a maximum data rate of 1.6 GB/sec. providing a maximum local memory bandwidth of 12.8 GB/sec per processing chip. The latency for a random access to memory over the RDRAM channel is 60 ns for the critical word, and an additional 30 ns for the rest of the cache line.

Unlike other chip modules, the memory controller does not have direct access to the intra-chip switch. Access to memory is controlled by and muted through the corresponding L2 controller. The L2 can issue read/write requests to memory, at the granularity of a cache line, for both data and the associated directory.

The preferred design of the memory controller consists of two parts: the Rambus™ Access Controller (RAC) and the memory controller engine. The RAC is provided by Rambus™ and incorporates all the high-speed interface circuitry.

The memory controller engine functionality includes the MC/L2 interface and the scheduling of memory accesses. Most of the complexity comes from deciding what pages to keep open across the various devices. In a fully populated PIRANHA™ processing chip, we have as many as 2K (512-byte) pages open. A hit to an open page reduces the access latency from 60 ns to 40 ns. Simulations show that keeping pages open for about 1 microsecond will yield a hit rate of over 50% on workloads such as OLTP.

E. Protocol Engines

As shown in FIG. 1, the PIRANHA™ processing node has two separate, protocol engines that are used to support shared-memory across multiple nodes. The home engine is responsible for exporting memory whose home is at the local node, while the remote engine imports memory whose home is remote. The following sections describe the protocol engine design, the directory storage, and the inter-node coherence protocol in more detail.

1. Protocol Engine Structure

Figure 4:
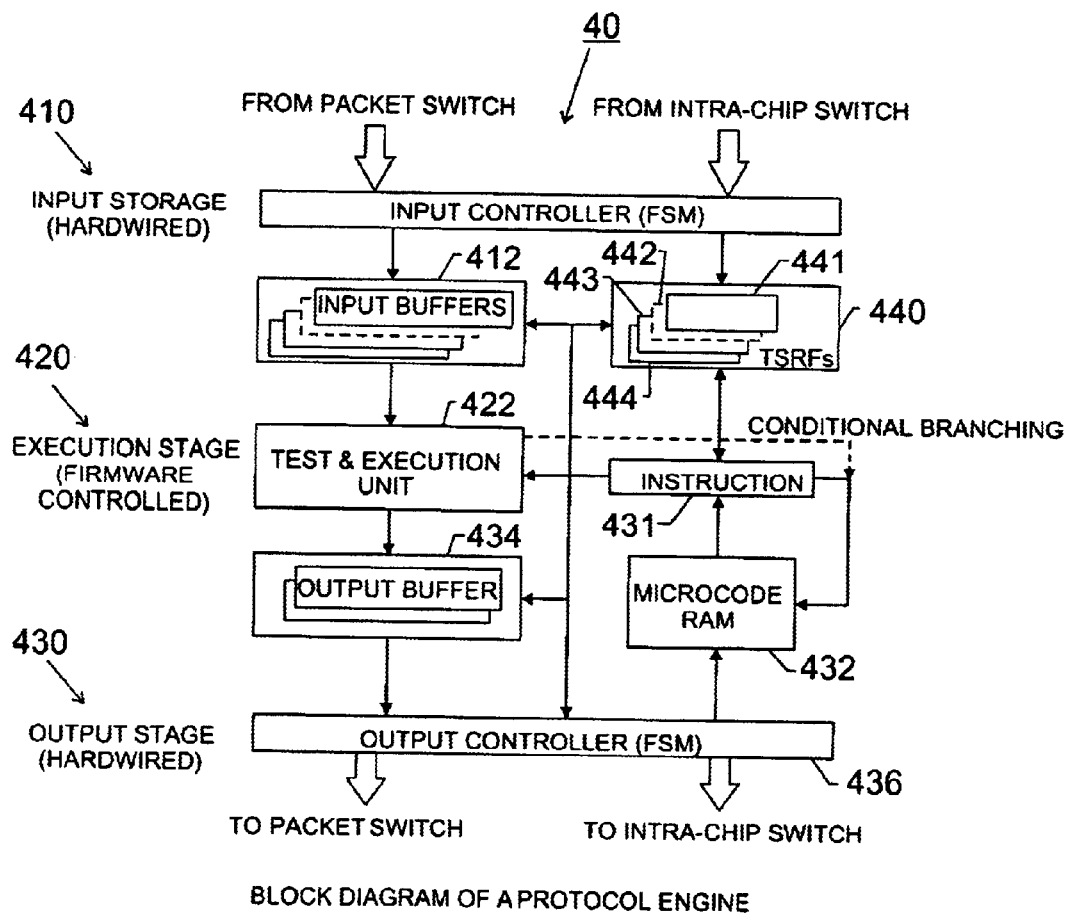
FIG. 4 is a block diagram of a protocol engine.

The protocol engines in the PIRANHA™ system are implemented as micro-programmable controllers, with the home and remote engines being virtually identical except for the microcode that they execute. The preferred approach uses a design philosophy similar to that used in the design of protocol engines for cache coherency protocols that exploit parallelism. FIG. 4 shows a high-level block diagram of one protocol engine. The illustrated protocol engine 40 includes three independent (and decoupled) stages: the input stage 410, the microcode-controlled execution stage 420, and the output stage 430. The input controller receives messages from either the local node or the external interconnect, while the output controller sends messages to internal or external destinations.

As shown in FIG. 4, a micro-sequencer includes a microcode memory (RAM) 432 and a current instruction register 431. The microcode memory 432 supports 1024 21-bit-wide instructions (the current protocol uses about 500 microcode instructions per engine). Each microcode instruction consists of a 3-bit opcode, two 4-bit arguments, and a 10-bit address that points to the next instruction to be executed. The preferred design uses instructions such as the following seven instruction types: SEND, RECEIVE, LSEND (to local node), LRECEIVE (from local node), TEST, SET and MOVE. The RECEIVE, LRECEIVE, and TEST instructions behave as multi-way conditional branches that can have up to 16 different successor instructions. These instructions are achieved by OR-ing a 4-bit condition code into the least significant bits of the 10-bit next-instruction address field. To allow for 500 MHz operation, an interleaved execution model is preferably used, wherein the next instruction is fetched for an even-addressed (/odd-addressed) thread while executing the instruction for an odd-addressed (/even-addressed) thread.

The actual protocol code is specified at a slightly higher level with symbolic arguments, and C-style code blocks, and a sophisticated microcode assembler is used to do the appropriate translation and mapping to the microcode memory. Typical cache coherence transactions require only a few instructions at each engine that handles the transaction. For example, a typical read transaction to a remote home involves a total of four instructions at the remote engine of the requesting node. The four instructions are: 1) the SEND instruction for sending the request to the home, 2) the RECEIVE instruction for receiving the reply, 3) the TEST instruction for testing a state variable, and 4) the LSEND instruction that replies to the waiting processor at that node.

For a thread of a new transaction, the protocol engine 40 allocates an entry (e.g., 441, ... 444) from a transaction state register file (TSRF) 440 that represents the state of this thread (e.g., addresses, program counter, timer, state variables, etc.). A thread that is waiting for a response from a local or remote node has its TSRF entry set to a waiting state, and the incoming response is later matched with this entry based on the transaction address. The preferred design supports a total of 16 TSRF entries per protocol engine to allow for concurrent protocol transactions.

This design is believed to provide a nice balance between flexibility (e.g., for late binding of protocol) and performance. While the design is less flexible than using a general-purpose processor such as the Stanford FLASH Multiprocessor, the specialized (more powerful) instructions lead to much lower protocol engine latency and occupancy.

2. Directory Storage

The PIRANHA™ system design supports directory data with virtually no memory space overhead by computing ECC at a coarser granularity and utilizing the unused bits for storing the directory information. ECC is computed across 256-bit boundaries (where typical boundary is 64 bit), leaving 44 bits for directory storage per 64-byte line. Compared to having a dedicated external storage and datapath for directories, this approach leads to lower cost by requiring fewer components and pins, and provides simpler system scaling. In addition, the design leverages the low latency, high bandwidth path provided by the integration of memory controllers on the chip.

Depending on the number of sharers, different directory representations can be used. The two directories used in this design include limited pointer and coarse vector. Two bits of a directory are used for state, with 42 bits available for encoding sharers. The directory is not used to maintain information about sharers at the home node. Furthermore, directory information is maintained at the granularity of a node (not individual processors). Given a 1K node system, vector representation switches to coarse vector representation past 4 remote sharing nodes.

3. Inter-node Coherence Protocol

A CMP system such as the PIRANHA™ uses an invalidation-based directory protocol with support for four request types: read, read-exclusive, exclusive and exclusive-without-data. The exclusive request type is used when the processor already has a shared copy. The exclusive-without-data request type corresponds to a ALPHA™ write-hint instruction (wh64) which indicates that the processor will write the entire cache line, thus avoiding a fetch of the line's current contents (e.g., useful in copy routines). Support of the additional features is provided, including: clean-exclusive optimization (an exclusive copy is returned to a read if there are no other sharers), reply forwarding from remote owner, and eager exclusive replies (ownership given before all invalidations are complete). Invalidation acknowledgments are gathered at the requesting node. Finally, the protocol does not depend on point-to-point order, thus allowing the external interconnect to use techniques such as adaptive routing.

A unique property of the inter-node coherence protocol is that it avoids the use of negative acknowledgment (NAK) messages and the corresponding retries. There are two reasons why NAKs are used in scalable coherence protocols. First, requests are NAKed to avoid deadlock when outgoing network paths (lanes) back up. Second, requests are NAKed due to protocol races where a request fails to find the data at the node to which it is forwarded. The first use of NAKs is avoided in the preferred design by using three virtual lanes (I/O, L, H). The low priority lane (L) is used by requests sent to a home node (except for write-back replacement requests that use H). The high priority lane (H), is used by forwarded requests and all replies. The deadlock solution also relies on sufficient buffering in the network (as later explained). The second use of NAKs can be avoided by guaranteeing that requests forwarded to target nodes can always be serviced by their target nodes. For example, when an owner node writes back its data to home, it maintains a valid copy of the data until the home acknowledges the write-back (allowing it to satisfy forwarded requests). There are also cases where a forwarded request may arrive at an owner node too early, i.e., before the owner node has received its own data. In this case, we delay the forwarded request until the data is available. The inter-node coherence protocol needs to support only a single forwarded request per request that is outstanding from the owner node. Therefore, the TSRF entry allocated for the outstanding request can be used to save information about the delayed, forwarded request.

The lack of NAKs/retries leads to a more efficient protocol and provides several important and desirable characteristics. First, since an owner node is guaranteed to service a forwarded request, the protocol can complete all directory state changes immediately. This property eliminates the need for extra confirmation messages sent back to the home (e.g., "ownership change" in a DASH multiprocessor using a directory-based cache coherence protocol), and also eliminates the associated protocol engine occupancy. Therefore, the inter-node coherence protocol handles 3-hop write transactions involving a remote owner more efficiently. Second, this protocol inherently eliminates livelock and starvation problems that arise due to the presence of NAKs. In contrast, the SGI Origin (scalable server) uses a number of complicated mechanisms such as keeping retry counts and reverting to a strict request-reply protocol, while most other protocols with NAKs ignore this important problem (e.g., DASH, FLASH).

Furthermore, a number of unique techniques are used to limit the amount of buffering needed in the network for avoiding deadlocks. First, the network uses "hot potato" routing with increasing age and priority when a message is non-optimally routed. This enables a message to theoretically reach an empty buffer anywhere in the network, making the buffering requirements grow linearly as opposed to quadratically with additional nodes. Second, the buffer space is shared among all lanes, so there is no need for separate buffer space per lane. Third, the number of messages injected in the network are bound as a result of a single request This technique is especially necessary for invalidation messages. A preferred new technique for invalidating messages, called cruise-missile-invalidates (CMI), allows invalidation of a large number of nodes by injecting only a handful of invalidation messages into the network. Each invalidation message visits a predetermined set of nodes, and eventually generates a single acknowledgment message when it reaches the final node in that set. Studies show that CMI can also lead to superior invalidation latencies by avoiding serializations that arise from injecting many invalidation messages from the home node and gathering the corresponding acknowledgments at the requesting node. The above properties allow a more limited amount of buffering per node that does not need to grow as more nodes are added. For example, with 16 TSRF entries per protocol engine and the use of CMI to limit invalidation messages to a total of 4, buffering for 128 message headers (2 protocol engines*16 TSRFs * 4 invalidations) is needed at each node with only 32 of them requiring space for data. Note that this buffer size is not a function of the number of nodes in the system.

F. System Interconnect

The PIRANHA™ system interconnect includes three distinct components: the output queue (OQ), the router (RT) and the input queue (IQ), as show for example, in FIG. 1. The OQ accepts packets via the packet switch from the protocol engines or from the system controller. The RT transmits and receives packets to and from other nodes, and also deals with transit traffic that passes through the RT without impacting other modules. The IQ receives packets that are addressed to the local node and forwards them to the target module via the packet switch.

The system interconnect can also be used to initialize PIRANHA™ chips. This method relies on the RT to initialize channels automatically. By default (after reset), the RT forwards all initialization packets to the system controller (SC), which interprets control packets and can access all control registers on a PIRANHA™ node. Other SC capabilities related to initialization include accessing the on-chip memories, updating the routing table, starting/stopping individual ALPHA™ cores, and testing the off-chip memory. An PIRANHA™ chip can also be initialized using the traditional PIRANHA™ boot process, where the primary caches are loaded from a small external EPROM over a bit-serial connection.

1. The Router (RT)

The RT is similar to the S-Connect design. Like the S-Connect, the RT uses a topology-independent, adaptive, virtual cut-through router core based on a common buffer pool that is shared across multiple priorities and virtual channels. Since PIRANHA™ nodes are not separated by long distances, there is no need to use in-band clock distribution and synchronization mechanisms as in the S-Connect. Furthermore, PIRANHA™ links are nearly 50 times faster than S-Connect links, hence the internal structure of our router is more advanced.

Each PIRANHA™ processing node has four channels that are used to connect it to other nodes in a point-to-point fashion (element 146 in FIG. 1). Each I/O node has two channels, allowing it to be connected to two other nodes for redundancy. The system interconnect supports two distinct packet types. The Short packet format is 128 bits long and is used for all data-less transactions. The Long packet has the same 128-bit header format along with a 64-byte (512 bit) data section. Packets are transferred in either 2 or 10 interconnect clock cycles.

Each interconnect channel consists of two sets of 22 wires, one set for each direction. These wires are high-quality transmission lines that are driven by special low-voltage swing CMOS drivers and are terminated on-chip at the remote end by matching receivers. The signaling rate is four times the system clock frequency, or 2 Gbits/sec per wire. With four channels, each PIRANHA™ processing node has a total interconnect bandwidth of 32 GB/sec. Channels use a piggyback handshake mechanism that deals with flow-control and transmission error recovery. The PIRANHA™ node uses a DC-balanced encoding scheme to minimize electrical problems related to high-speed data transmission. By guaranteeing that 11 of the 22 wires will always be in the '1' state while the others are in the '0' state, the net current flow along a channel is zero. This also allows a reference voltage for differential receivers to be generated at the termination without doubling the number of signal wires. The signaling scheme encodes 19 bits into a 22-bit DC-balanced word. The PIRANHA™ node sends 16 data bits along with 2 extra bits that are used for CRC, flow control and error recovery. By design, the set of codes used to represent 18 bits has no two elements that are complementary. This allows the randomly-generated 19$^{th}$ bit to be encoded by inverting all 22 bits. The resulting code is inversion insensitive and it DC-balances the links statistically in the time-domain along each wire. Therefore the PIRANHA™ system can use fiber-optic ribbons to interconnect nodes, as well as transformer coupling to minimize EMI problems for cables connecting two PIRANHA™ system packs.

2. The Input (IQ) and Output (OQ) Queues

The OQ provides a modest amount of buffering through a set of FIFOs that dc-couple the operation of the router from the local node. The fall-through path is optimized, with a single cycle delay when the router is ready for new traffic. However, as the interconnect load increases, the router gives priority to transit traffic, and accepts new packets only when it has free buffer space and no incoming packets. This policy results in better overall performance. The OQ also supports 4 priority levels and ensures that lower priority packets cannot block higher priority traffic. This property is maintained throughout the system interconnect.

The IQ receives packets from the RT and forwards them to their target modules via the packet switch. It is important to quickly remove terminal packets from the RT because the high-speed operation makes buffering in the RT expensive. For this reason, the IQ has more buffer-space than the OQ. Like the OQ, the IQ supports four priority levels. To improve overall system performance, the IQ allows low priority traffic to bypass high priority traffic if the latter is blocked and the former can proceed to its destination.

The IQ is more complex than the OQ because it must interpret packets to determine their destination module. This process is controlled by a disposition vector that is indexed by the packet type field (4 bits encode 16 major packet types). During normal operation, most packets are directed at the protocol engines while some packets (e.g., interrupts) are delivered to the system controller.

G. Reliability Features

A CMP system such as the PIRANHA™ supports a number of elementary Reliability, Availability, and Serviceability (RAS) features such as redundancy on all memory components, CRC protection on most datapaths, redundant datapaths, protocol error recovery, error logging, hot-swappable links, and in-band system reconfiguration support. Furthermore, PIRANHA™ attempts to provide a platform for investigating advanced RAS features for future large-scale servers. In order to enable future developments of complete solutions for RAS in large-scale systems the design provides hardware hooks. These RAS features can be implemented by changing the semantics of memory accesses through the flexibility available in the programmable protocol engines.

Examples of RAS features of interest are persistent memory regions, memory mirroring, and dual-redundant execution. Persistent memory regions can survive power failures, system crashes or other transient errors, and can greatly accelerate database applications that currently rely on committing state to disk or NVDRAM at transaction boundaries. Beyond adding a battery to the main memory banks and designing the memory controller so that it can power cycle safely, persistent memory requires mechanisms to force volatile (cached) state to safe memory, as well as mechanisms to control access to persistent regions. This can be implemented by making the protocol engines intervene in accesses to persistent areas and perform capability checks or persistent memory barriers. Similarly, Piranha's protocol engines can be programmed to intervene on memory accesses to provide automatic data mirroring, or to perform checks on the results of dual-redundant computation.

II. Evaluation Methodology

In addition to chip multiprocessing (CMP), a PIRANHA™-based system can incorporate other models pertinent to scalable shared-memory designs. This section discusses studies of related models and then describes the workloads, simulation platform, and various architectures that are used in evaluating the CMP system such as PIRANHA™.

A. Related Models

The increasing importance of database workloads and the CMP approach suggests the need for studies of database applications (both OLTP and DSS). One such study evaluates user-level traces of database workloads in the context of wide-issue out-of-order processors, and show that the gains for DSS are substantial while the gains for OLTP are more limited (consistent with the results provided in FIGS. 5–8 as explained herein). Other studies address issues related to the effectiveness of different memory system architectures for OLTP workloads. Among them, one study shows the need for large direct-mapped off-chip caches (8 MB). A second study shows that a large off-chip cache (16 MB) is not adversely affected by cache interference caused by fine-grain multithreading. A more recent study shows that smaller, more associative caches (e.g., 2 MB 4-way) that can be integrated on-chip can actually outperform larger direct-mapped off-chip caches. However, the simulation results outlined herein show that small associative second-level on-chip caches (1 MB 8-way in our case) are still effective when shared among multiple processors or threads. Yet another study shows that aggressive chip-level integration of the memory system, coherence, and network modules on a single chip (as in ALPHA™ 21364) can provide large gains for OLTP workloads. However, the description herein provides a first look at a detailed evaluation of database workloads in the context of chip multiprocessing.

B. Workloads

The OLTP workload used in this case is modeled after the TPC-B benchmark (transaction processing performance council benchmark B standard specification, Revision 2.0, June 1994). This benchmark models a banking database system that keeps track of customers' account balances, as well as balances per branch and teller. Each transaction updates a randomly chosen account balance, which includes updating the balance of the branch the customer belongs to and the teller from which the transaction is submitted. It also adds an entry to the history table, which keeps a record of all submitted transactions. Our DSS workload is modeled after Query 6 of the TPC-D benchmark (DSS—decision support standard specification). The TPC-D benchmark represents the activities of a business that sells a large number of products on a worldwide scale. It consists of several inter-related tables that keep information such as parts and customer orders. Query 6 scans the largest table in the database to assess the increase in revenue that would have resulted if some discounts were eliminated. The behavior of this query is representative of other TPC-D queries, though some queries exhibit less parallelism.

For the study, the Oracle 7.3.2 commercial database management system is used as a database engine. In addition to the server processes that execute the actual database transactions, Oracle 7.3.2 spawns a few daemon processes that perform a variety of duties in the execution of the database engine. Two of these daemons, the database writer and the log writer, participate directly in the execution of transactions. The database writer daemon periodically flushes modified database blocks that are cached in memory out to disk. The log writer daemon is responsible for writing transaction logs to disk before it allows a server to commit a transaction.

The preferred OLTP and DSS workloads are set up and scaled in a similar way as a study of memory system characterization of commercial loads that validated such scaling. Also used is a TPC-B database with 40 branches with a shared-memory segment (SGA) size of approximately 600 MB (the size of the metadata area is about 80 MB). The study consists of 500 transactions after a warm-up period. The Oracle is used in a dedicated mode for this workload, wherein each client process has a dedicated server process for serving its transactions. To hide I/O latencies, including the latency of log writes, OLTP runs are usually configured with multiple server processes per processor. This study uses 8 processes per processor. For DSS, the study uses Oracle with the Parallel Query Optimization option, which allows the database engine to decompose the query into multiple sub-tasks and assign each one to an Oracle server process. The DSS experiments use an in-memory 500 MB database, and the queries are parallelized to generate four server processes per processor.

C. Simulation Environment

The environment used for the proposed simulations includes the SimOS-ALPHA™ environment (the ALPHA™ port of SimOS), which has been used in the study of commercial applications and has been validated against ALPHA™ multiprocessor hardware. SimOS-ALPHA™ is a fill system simulation environment that simulates the hardware components of ALPHA™-based multiprocessors (processors, MMU, caches, disks, console) in enough detail to run ALPHA™ system software. Specifically, SimOS-ALPHA™ models the micro-architecture of an ALPHA™ processor and runs essentially unmodified versions of Tru64 Unix 4.0 and PALcode.

The ability to simulate both user and system code under SimOS-ALPHA™ is essential given the rich level of system interactions exhibited by commercial workloads. For example, for the OLTP runs in this study, the kernel component is approximately 25% of the total execution time (user and kernel). In addition, setting up the workload under SimOS-ALPHA™ is particularly simple since it uses the same disk partitions, databases, application binaries, and scripts that are used on our hardware platforms to tune the workload.

SimOS-Aipha supports multiple levels of simulation detail, enabling the user to choose the most appropriate trade-off between simulation detail and slowdown. The fastest simulator uses an on-the-fly binary translation technique, similar to the Embra machine simulation, in order to position the workload into a steady state. For the medium-speed (in simulation time) processor module, SimOS-Aipha models a single-issue pipelined processor. Finally, the slowest-speed processor module models a multiple-issue out-of-order processor. The medium-speed in-order model is used for evaluating the PIRANHA™ processor cores and the slow-speed out-of-order model is used to evaluate aggressive next-generation processors.

D. Simulated Architectures

Table 1 below presents the processor and memory system parameters for the different processor configurations being studied. For the next-generation microprocessor, the study models a very aggressive design similar to ALPHA™ 21364 which integrates a 1 GHz out-of-order core, two levels of caches, memory controller, coherence hardware, and network router all on a single die (with an area comparable to the PIRANHA™ processing chip). The use of an ASIC process limits the frequency of the processor cores in the PIRANHA™ to 500 MHz. In addition, the use of the lower density ASIC SRAM cells, along with the integration of eight simple processor cores, limits the amount of second-level on-chip cache in PIRANHA™. However, the lower target clock frequency in PIRANHA™ allows for a higher associativity cache. The full-custom PIRANHA™ parameters are used to illustrate the potential for the PIRANHA™ architecture if the design were to be done with a larger team and investment. Given the simple single-issue in-order pipeline, it is reasonable to assume that a full-custom approach can lead to a faster clock frequency than a 4-issue out-of-order design.

TABLE 1

Parameters for different processor designs.

| Parameter | PIRANHA ™ (P8) | Next-Generation Microprocessor (OOO) | Full-Custom PIRANHA ™ (P8F) |
|---|---|---|---|
| Processor speed | 500 MHz | 1 GHz | 1.25 GHz |
| Type | in-order | out-of-order | in-order |
| Issue Width | 1 | 4 | 1 |
| Instruction Window Size | — | 64 | — |
| Cache Line Size | 64 bytes | 64 bytes | 64 bytes |
| L1 Cache Size | 64 KB | 64 KB | 64 KB |
| L1 Cache Associativity | 2-way | 2-way | 2-way |
| L2 Cache Size | 1 MB | 1.5 MB | 1.5 MB |
| L2 Cache Associativity | 8-way | 6-way | 6-way |
| L2 Hit/L2 Fwd Latency | 16 ns/24 ns | 12 ns/NA | 12 ns/16 ns |
| Local Memory Latency | 80 ns | 80 ns | 80 ns |
| Remote Memory Latency | 120 ns | 120 ns | 120 ns |
| Remote Dirty Latency | 180 ns | 180 ns | 180 ns |

Table 1 also shows the memory latencies for different configurations. Due to the lack of inclusion in PIRANHA™'s L2 cache, there are two latency parameters corresponding to either the L2 servicing the request (L2 Hit) or the request being forwarded to be serviced by another on-chip L1 (L2 Fwd). As shown in Table 1, the PIRANHA™ prototype has a higher L2 hit latency than a full-custom processor due to the use of slower ASIC SRAM cells.

III. Performance Evaluation of Piranha

This section compares the performance of the PIRANHA™ system with an aggressive out-of-order processor (OOO in Table 1) in both single-chip and multi-chip configurations. In addition, results are presented for a potential full-custom PIRANHA™ design (P8F in Table 1) that more fairly judges the merits of the architecture. The OLTP and DSS database workloads as described in the previous section are used for this evaluation.

Figure 5:
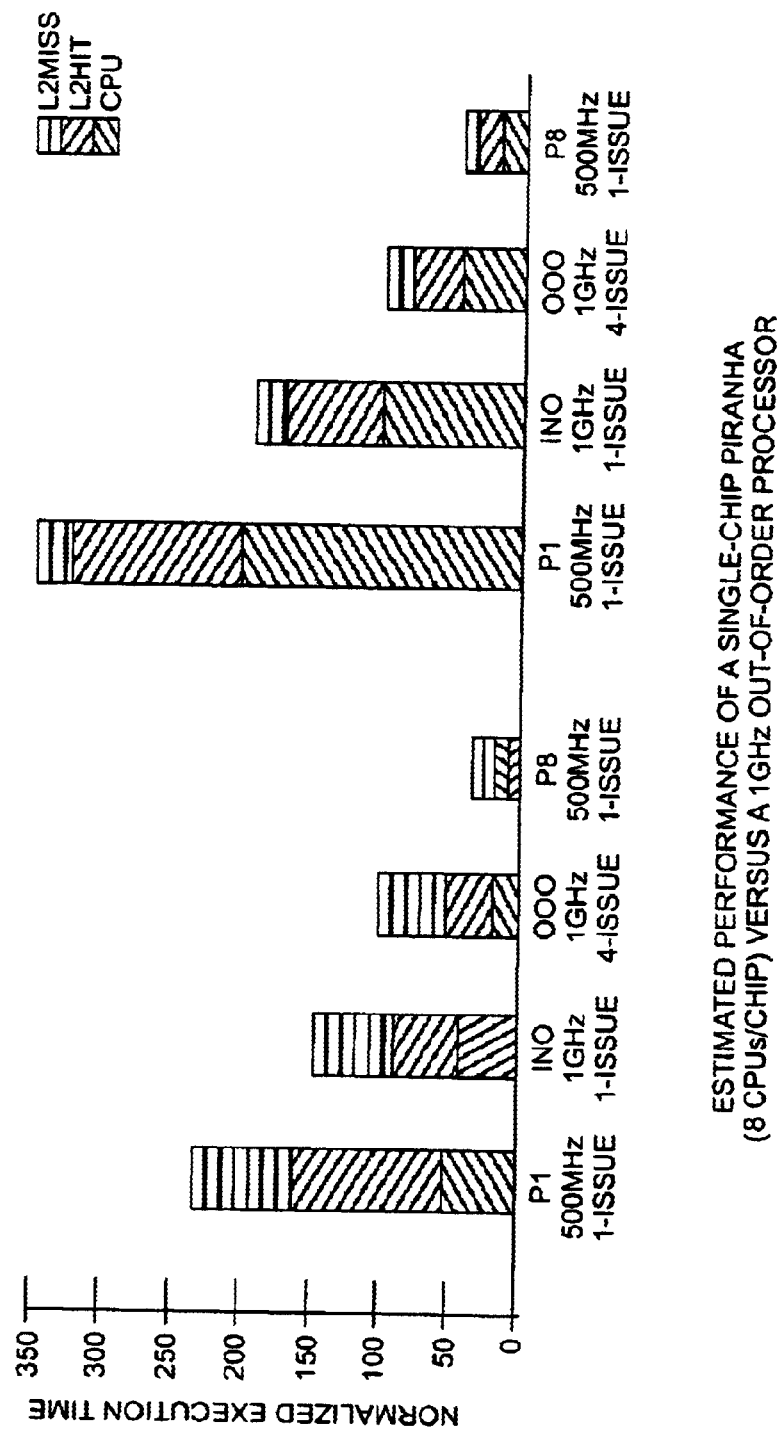
FIG. 5 shows the estimated performance of a single-chip PIRANHA™ (8 CPUs/chip) versus a 1 GHz out-of-order processor.
Figure 6:
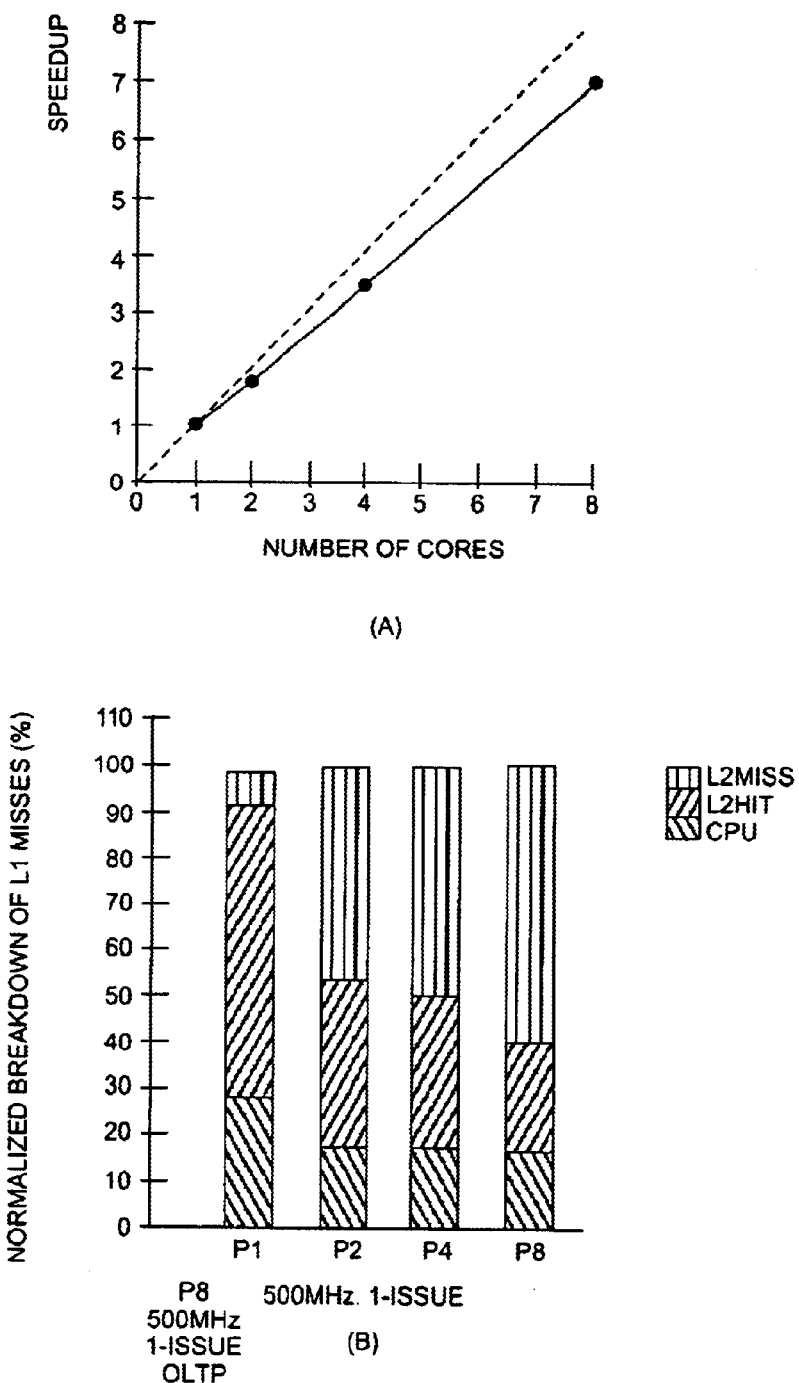
FIGS. 6A and 6B illustrate respectively (a) speedup and (b) L1 miss breakdown for OLTP.

FIG. 5 shows results obtained for single-chip configurations for both OLTP and DSS. The four configurations studied are: a hypothetical single-CPU PIRANHA™ chip (P1), a next-generation out-of-order processor (OOO), a hypothetical single-issue in-order processor otherwise identical to OOO (INO), and the actual eight-CPU PIRANHA™ chip (P8). The P1 and INO configurations are used to better isolate the various factors that contribute to the performance differences between OOO and P8. FIG. 5 shows execution time normalized to that of OOO. The execution time is divided into CPU busy time, L2 hit stall time, and L2 miss stall time. For the P8 configuration, the L2 hit stall time includes both L2 hits as well as forwarded L2 requests served by an L1 (see L2 Fwd latency in Table 1). Focusing on the OLTP, the results demonstrate that OOO outperforms P1 (as expected) by about 2.3 times. The INO result confirms that the faster frequency (1 GHz vs. 500 MHz) and lower L2 hit latency (12 ns in INO/OOO vs. 16/24 ns in P1/P8) alone account for an improvement of 1.6 times. The wider-issue and out-of-order features provide the remaining 1.45 times gain. However, once eight of the simpler CPUs are integrated on the single-chip PIRANHA™ (P8), it outperforms OOO by almost 3 times.

As shown in FIG. 6(a), the reason for the exceptional performance on OLTP of the PIRANHA™ system, is that it achieves a speedup of nearly seven times with eight on-chip CPUs relative to a single CPU (P1). This speedup arises from the abundance of thread-level parallelism in OLTP, along with the extremely tight-coupling of the on-chip CPUs through the shared second-level cache (leading to small communication latencies), and the effectiveness of the on-chip caches in PIRANHA™. The last effect is clearly observed in FIG. 6(b) which shows the behavior of the L2 cache as more on-chip CPUs are added. FIG. 6(b) shows a breakdown of the total number of L1 misses that are served by the L2 (L2 Hit), forwarded to another on-chip L1 (L2 Fwd), or served by the memory (L2 Miss). Although the fraction of L2 hits drops from about 90% to below 40% when moving from 1 to 8 CPUs, the fraction of L2 misses that go to memory remains constant at under 20% past a single CPU. In fact, adding CPUs (and their corresponding L1s) in PIRANHA™'s non-inclusive cache hierarchy actually increases the amount of on-chip memory (P8 doubles the on-chip memory compared to P1). This increase partially offsets the effects of the increased pressure on the L2. The overall trend is that as the number of CPUs increases, more L2 misses are served by other L1 s instead of going to memory. Even though "L2 Fwd" accesses are slower than L2 Hits (24 ns vs. 16 ns), they are still much faster than a memory access (80 ns). Overall, Piranha's non-inclusion policy is effective in utilizing the total amount of on-chip cache memory (i.e., both L1 and L2) to contain the working set of a parallel application.

In addition to the above on-chip memory effects, the simultaneous execution of multiple threads enables PIRANHA™ to tolerate long latency misses by allowing threads-in other CPUs to proceed independently. As a result, a PIRANHA™ chip can sustain a relatively high CPU utilization level despite having about triple (3x) the number of L2 misses compared to OOO (from simulation data not shown here). On-chip and off-chip bandwidths are also not a problem even with eight CPUs because OLTP is primarily latency bound. Finally, OLTP workloads have been shown to exhibit constructive interference in the instruction and data streams, and this works to the benefit of the PIRANHA™ system.

The performance edge of the PIRANHA™ system over OOO in transaction processing is robust to the specific workload used and to changes in design parameters. Using a workload modeled after the TPC-C benchmark, the results of the proposed study showed that P8 outperforms OOO by a factor greater than three (>3x times). A sensitivity study can be made of the PIRANHA™ system's performance to more pessimistic design parameters such as: 400 MHz CPUs with 32 KB one-way L1s, and L2 latencies of 22 ns (L2 Hit) and 32 ns (L2 Fwd). Even though the execution time is longer by 29% with these parameters, PIRANHA™ still holds a 2.25 times performance advantage over OOO on OLTP.

Referring back to FIG. 5, it is noted that PIRANHA™ (P8) also outperforms OOO for DSS, although by a narrower margin than for OLTP (2.3 times). The main reason for the narrower margin comes from the workload's smaller memory stall component (under 5% of execution time) and better utilization of issue slots in a wide-issue out-of-order processor. DSS is composed of tight loops that exploit spatial locality in the data cache and have a smaller instruction footprint than OLTR. Since most of the execution time in DSS is spent in the CPU, OOO's faster clock speed alone nearly doubles its performance compared to P1 (P1 vs. INO), with almost another doubling due to wider-issue and out-of-order execution (INO vs. OOO). However, the smaller memory stall component of DSS also benefits PIRANHA™, as it achieves near-linear speedup with 8 CPUs (P8) over a single CPU (P1).

One interesting alternative to consider for PIRANHA™ is to trade CPUs for a larger L2 cache. Namely, increase the L2 size at the expense of a reduced number of CPUs. However, since the fraction of L2 miss stall time is relatively small (e.g., about 22% for P8 in FIG. 5), the improvement in execution time from even an infinite L2 would also be modest. Moreover, since PIRANHA™ CPUs are small, relatively little SRAM can be added per CPU removed. As a result, such a trade-off does not seem advantageous for the PIRANHA™ system. There is however a relatively wide design space if one considers increasingly complex CPUs in a chip-multiprocessing system.

Figure 7:
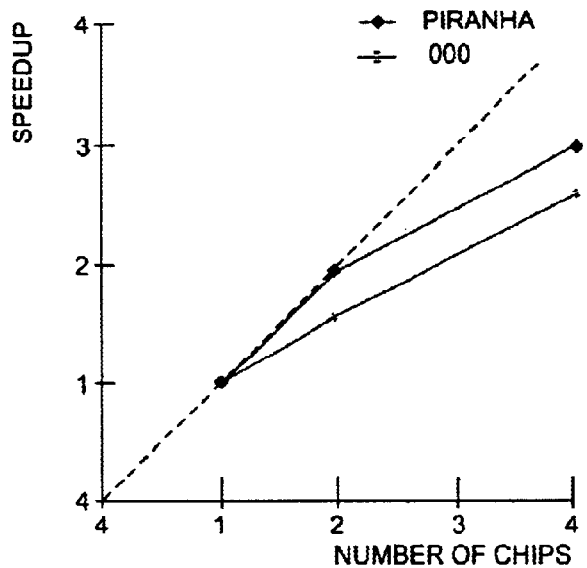
FIG. 7 shows the speedup of OLTP in multi-chip systems with 500 MHz4-CPU chip-multiprocessors in accordance with the present invention versus 1 GHz out-of-order chips (e.g., a single-chip 4-CPU is approximately 1.5× than the single-chip OOO).

In addition to the single-chip comparisons above, it is important to evaluate how a PIRANHA™ system performs in multi-chip (i.e., NUMA) configurations. FIG. 7 shows the speedup trends for OLTP when going from a single chip to a four-chip system for both PIRANHA™ and OOO (DSS scalability, not shown, is near linear for both systems). In these experiments, the PIRANHA™ chip uses 4 CPUs per chip (i.e., P4). It is noted that the version of the operating system used in the proposed simulation environment limits the system to 16 CPUs. Therefore, to study multi-chip scaling, one needs to consider PIRANHA™ chips with four on-chip CPUs. The figure shows that the PIRANHA™ system scales better than OOO (3.0 vs. 2.6) for the range of system sizes studied. This is so, even though operating system scalability limitations could adversely affect PIRANHA™ given its higher total count of 16 (albeit slower) CPUs versus 4 for OOO. However, the effectiveness of on-chip communication in PIRANHA™ offsets the OS overheads normally associated with larger CPU counts. In general it is expected that the PIRANHA™ system scalability is on par with that of OOO systems.

Figure 8:
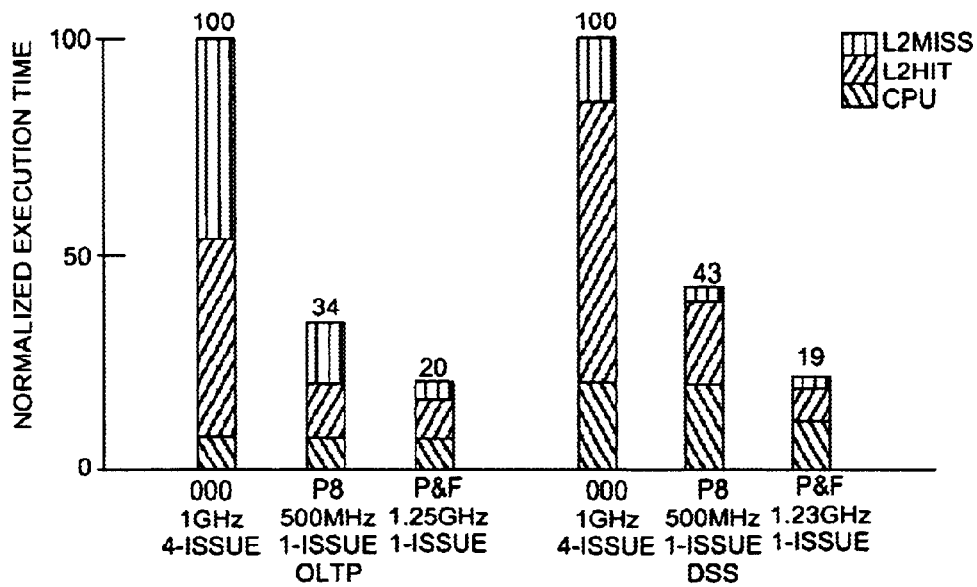
FIG. 8 illustrates the performance potential of a full-custom chip-multiprocessor for OLTP and DSS.

So far the performance of PIRANHA™ was considered under the constraints of the ASIC design methodology being used to implement the prototype. To fairly judge the potential of the PIRANHA™ approach, the performance of a full-custom implementation is evaluated (see Table 1 for P8F parameters). FIG. 8 compares the performance of a full-custom PIRANHA™ with that of OOO, both in single-chip configurations. The figure shows the faster fill-custom implementation can further boost PIRANHA™'s performance to 5.0 times over OOO in OLTP and 5.3 times in DSS. DSS sees particularly substantial gains since its performance is dominated by CPU busy time, and therefore it benefits more from the 150% boost in clock speed (P8 vs. P8F). The gains in OLTP are also mostly from the faster clock cycle, since the relative improvement in memory latencies is smaller with respect to the original P8 parameters.

Overall, the PIRANHA™ architecture seems to be a better match for the underlying thread-level parallelism available in database workloads than a typical next generation out-of-order superscalar processor design which relies on its ability to extract instruction-level parallelism.

IV. Design Methodology and Implementation

The preferred design methodology for a CMP system, such as the PIRANHA™, starts with architectural specification in the form of C++ based models for each of the major PIRANHA™ modules (e.g., L2 cache, protocol engine). The C++ models implement behavior in a cycle-accurate fashion and use the same boundary signals as in the actual implementation. These models form the starting point for Verilog coding followed by synthesis for timing. The C++ models execute much faster than their Verilog counterparts, allowing for more efficient functional and architectural verification. This methodology also allows C++ and Verilog models to be interchanged or mixed for development and verification purposes. Finally, the coherence protocols are also verified using formal methods.

The PIRANHA™ system is preferably implemented in a semi-custom 0.18 micron ASIC design flow. This design flow uses industry standard hardware description languages and synthesis tools. Hence, it has the advantage of improved portability to evolving ASIC process technologies and shorter time-to-market when compared to full-custom design methodologies. To achieve the 500 MHz frequency target, the implementation depends on a small number of custom circuit blocks for some of the time-critical SRAM cache memory. The implementation uses also some specialized synthesis and layout tools that specifically target datapaths and arithmetic units. The ASIC process technology includes high density SRAM with cell sizes on the order of 4.2 $\mu m^2$ and gate delays of 81 ps (worst case) for an unloaded 2-input NAND.

Figure 9:
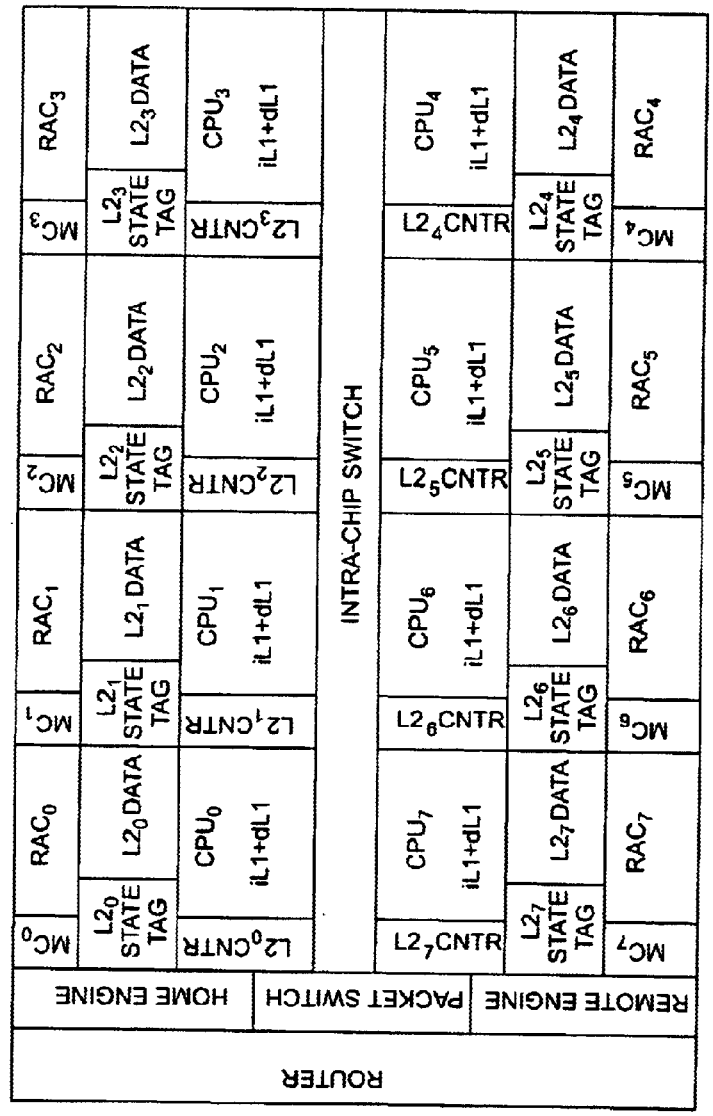
FIG. 9 shows a floor-plan of a processing node with eight CPU cores.

Assuming this PIRANHA™ implementation, the clock frequency can be inferred from preliminary logic synthesis of the processor core and critical path estimates for the various modules. Also, the area for each of the major modules can be calculated using estimates from compilable memory arrays, logic synthesis, and simple gate counts. From these area estimates, a general floor-plan of the PIRANHA™ processing node can be developed as illustrated in FIG. 9. Roughly 75% of such PIRANHA™ processing node area is dedicated to the ALPHA™ cores and L1/L2 caches, with the remaining area allocated to the memory controllers, intra-chip interconnect, router, and protocol engines.

The foregoing evaluation of PIRANHA™-based designs has been primarily focused on commercial database workloads. We expect PIRANHA™ system to also be well suited for a large class of web server applications that have explicit thread-level parallelism. Previous studies have shown that some web server applications, such as the AltaVista search engine, exhibit behavior similar to decision support (DSS) workloads.

V. Summary

In conclusion, the use of chip multiprocessing is inevitable in future microprocessor designs. Advances in semiconductor technology are enabling designs with several hundred million transistors in the near future. Next-generation processors such as the ALPHA™ 21364 are appropriately exploiting this trend by integrating the complete cache hierarchy, memory controllers, coherence hardware, and network routers all onto a single chip. As more transistors become available, further increasing on-chip cache sizes or building more complex cores will only lead to diminishing performance gains and possibly longer design cycles in the case of the latter option. While techniques such as simultaneous multithreading can remedy the diminishing gains, they do not address the increasing design complexity. At the same time, using the extra transistors to integrate multiple processors onto the same chip is promising, especially given the abundance of explicit thread-level parallelism in important commercial workloads. A increasing number of next-generation processor designs subscribe to this philosophy by integrating two superscalar cores on a single die. The key questions for designers of future processors will not be whether to use chip multiprocessing, but the appropriate trade-off between the number of cores and the power of each core, and how to best partition the memory hierarchy among the multiple cores.

Finally, the description herein outlines a CMP system architecture such as the PIRANHA™ architecture which realizes a far-reaching approach to chip multiprocessing (CMP) by integrating eight simple processor cores along with a complete cache hierarchy, memory controllers, coherence hardware, and network router all onto a single chip to be built with the next-generation 0.18 um CMOS process. Although ASIC design with simple single-issue in-order processor cores is a preferred choice for a small design team with limited resources, other approaches such as a full custom design would be preferred over this ASIC design for a larger design team with more resources. As noted above, even with this ASIC design the simulation results show that a CMP such as the PIRANHA™-based approach can outperform aggressive next-generation processors by a factor of 2.9 times (on a per chip basis) on important commercial workloads such as OLTP. A full-custom design, which would require a larger design team, has the potential to extend this performance advantage to almost five times. It is noted that a CMP system such as the PIRANHA™ is not an optimal design choice if the goal is to achieve the best SPECint or SPECfp numbers because of the lack of sufficient thread-level parallelism in such workloads. However, the outlined results clearly indicate that focused designs such as the PIRANHA™-based design that directly target commercial server applications can substantially outperform general-purpose microprocessor designs with much higher complexity. In closing, a PIRANHA™-based design is a showcase example of CMP designs based on simple processor cores, as well as shared second-level cache with relaxed inclusion property or non-inclusion, efficient intra-node and inter-node coherence protocols and their interaction, and unique I/O architecture. This CMP design, provide further insight for CMP processor and scalable designs in the future.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A chip-multiprocessing system with scalable architecture, comprising, on a single chip:

a plurality of processor cores;

a two-level cache hierarchy including:

a pair of instruction and data caches for, and private to, each processor core, the pair being first level caches; and a second level cache with a relaxed inclusion property, the second-level cache being logically shared by the plurality of processor cores, the second level cache being modular with a plurality of interleaved modules, each of the plurality of interleaved modules having its own controller, on-chip tag and data storage;

one or more memory controllers capable of operatively communicating with the two-level cache hierarchy and with an off-chip memory, each of the plurality of interleaved modules being attached to one of the memory controllers which interfaces to a bank of memory chips;

a cache coherence protocol;

one or more coherence protocol engines;

an intra-chip switch; and an interconnect subsystem.

2. A chip-multiprocessing system as in claim 1, wherein the controllers in the plurality of interleaved modules are responsible for enforcing coherence within the single chip.

3. A chip-multiprocessing system as in claim 1, wherein access to a specific one of the one or more memory controllers is controlled by and muted through a corresponding one of controllers in the plurality of interleaved modules.

4. A chip-multiprocessing system with scalable architecture, comprising on a single chip:

a plurality of processor cores;

a two-level cache hierarchy including:

a pair of instruction and data caches for, and private to, each processor core, the pair being first level caches; and a second level cache with a relaxed inclusion property, the second-level cache being logically shared by the plurality of processor cores, the second level cache being modular with a plurality of interleaved modules, each of the plurality of interleaved modules having its own control logic for maintaining intra-chip coherence and cooperation with the plurality of coherence protocol engines and an intra-chip switch interface for intra-chip communication within the single chip;

one or more memory controllers capable of operatively communicating with the two-level cache hierarchy and with an off-chip memory, each of the plurality of interleaved modules having a dedicated interface to one of the one or more memory controllers;

a cache coherence protocol;

one or more coherence protocol engines;

an intra-chip switch; and an interconnect subsystem.

* * * * *